United States Patent
Wago et al.

(10) Patent No.: US 6,979,524 B2
(45) Date of Patent: Dec. 27, 2005

(54) CONTACT PRINTING OF LONGITUDINAL MAGNETIC MEDIA WITH PERPENDICULARLY APPLIED MAGNETIC FIELD

(75) Inventors: Koichi Wago, Sunnyvale, CA (US); Shih-Fu Lee, Fremont, CA (US); Li-Ping Wang, Fremont, CA (US); Joseph Leigh, Campbell, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 108 days.

(21) Appl. No.: 10/418,124

(22) Filed: Apr. 18, 2003

(65) Prior Publication Data

US 2004/0209185 A1  Oct. 21, 2004

(51) Int. Cl.$^7$ ............... G11B 5/03; G11B 5/86
(52) U.S. Cl. ............ 430/270.1; 430/39; 360/17; 360/55; 360/66; 360/75; 360/131; 360/694 TR; 428/128; 428/692; 428/900
(58) Field of Search ............... 430/270.1, 39; 360/17, 75, 694 TR, 66, 55, 131; 428/900, 428/128, 692

(56) References Cited

U.S. PATENT DOCUMENTS

| | | | |
|---|---|---|---|
| 5,991,104 A | 11/1999 | Bonyhard | |
| 6,347,016 B1 | 2/2002 | Ishida et al. | |
| 6,807,025 B1 * | 10/2004 | Benakli et al. | ............... 360/66 |
| 2002/0034107 A1 | 3/2002 | Saito | |

\* cited by examiner

*Primary Examiner*—Thorl Chea
(74) *Attorney, Agent, or Firm*—McDermott Will & Emery LLP

(57) ABSTRACT

A method of forming a magnetic transition pattern in a longitudinal magnetic recording medium, comprising steps of:
(a) providing a magnetic recording medium including a layer of a magnetic material having a surface comprised of a plurality of longitudinally extending magnetic domains;
(b) contacting the surface of the layer of magnetic material with a topographically patterned imprinting surface of a stamper/imprinter formed of at least one high saturation magnetization, high permeability magnetic material; and
(c) applying a unidirectional magnetic field perpendicular to the imprinting surface of the stamper/imprinter, the perpendicular magnetic field creating a longitudinal magnetic field component of sufficient strength to effect selective alignment of the magnetic domains of those portions of the layer of magnetic material which face the depressions of the imprinting surface while retaining the alignment of the magnetic domains of those portions of the layer of magnetic material which face the projections of the imprinting surface, the combination of portions forming a magnetic transition pattern replicating the topographical pattern of the imprinting surface.

11 Claims, 4 Drawing Sheets

CONTACT PRINTING OF LONGITUDINAL MAGNETIC MEDIA WITH PERPENDICULARLY APPLIED MAGNETIC FIELD

FIELD OF THE INVENTION

The present invention relates to methods for forming magnetic transition patterns in a layer or body of magnetic material by means of contact printing. The invention has particular utility in the formation of servo patterns in the surfaces of magnetic recording layers of magnetic data/information storage and retrieval media, e.g., hard disks.

BACKGROUND OF THE INVENTION

Magnetic recording media are widely used in various applications, e.g., in hard disk form, particularly in the computer industry for storage and retrieval of large amounts of data/information in magnetizable form. Such media are conventionally fabricated in thin film form and are generally classified as "longitudinal" or "perpendicular", depending upon the orientation (i.e., parallel or perpendicular) of the magnetic domains of the grains of the magnetic material constituting the active magnetic recording layer, relative to the surface of the layer.

A portion of a conventional thin-film, longitudinal-type recording medium 1 utilized in disk form in computer-related applications is schematically depicted in FIG. 1 and comprises a non-magnetic substrate 10, typically of metal, e.g., an aluminum-magnesium (Al—Mg) alloy, having sequentially deposited thereon a plating layer 11, such as of amorphous nickel-phosphorus (NiP), a polycrystalline underlayer 12, typically of chromium (Cr) or a Cr-based alloy, a magnetic layer 13, e.g., of a cobalt (Co)-based alloy, a protective overcoat layer 14, typically containing carbon (C), e.g., diamond-like carbon ("DLC"), and a lubricant topcoat layer 15, typically of a perfluoropolyether compound applied by dipping, spraying, etc.

In operation of medium 1, the magnetic layer 13 is locally magnetized by a write transducer or write head (not shown in FIG. 1 for simplicity) to record and store data/information. The write transducer creates a highly concentrated magnetic field which alternates direction based on the bits of information being stored. When the local magnetic field applied by the write transducer is greater than the coercivity of the recording medium layer 13, then the grains of the polycrystalline medium at that location are magnetized. The grains retain their magnetization after the magnetic field applied by the write transducer is removed. The direction of the magnetization matches the direction of the applied magnetic field. The pattern of magnetization of the recording medium can subsequently produce an electrical response in a read transducer, allowing the stored medium to be read.

A typical contact start/stop (CSS) method employed during use of disk-shaped media involves a floating transducer head gliding at a predetermined distance from the surface of the disk due to dynamic pressure effects caused by air flow generated between mutually sliding surfaces of the transducer head and the disk. During reading and recording (writing) operations, the transducer head is maintained at a controlled distance from the recording surface, supported on a bearing of air as the disk rotates, such that the transducer head is freely movable in both the circumferential and radial directions, thereby allowing data to be recorded and retrieved from the disk at a desired position in a data zone.

Adverting to FIG. 2, shown therein, in simplified, schematic plan view, is a magnetic recording disk 30 (of either longitudinal or perpendicular type) having a data zone 34 including a plurality of servo tracks, and a contact start/stop (CSS) zone 32. A servo pattern 40 is formed within the data zone 34, and includes a number of data track zones 38 separated by servo tracking zones 36. The data storage function of disk 30 is confined to the data track zones 38, while servo tracking zones 36 provide information to the disk drive which allows a read/write head to maintain alignment on the individual, tightly-spaced data tracks.

Although only a relatively few of the servo tracking zones are shown in FIG. 2 for illustrative simplicity, it should be recognized that the track patterns of the media contemplated herein may include several hundreds of servo zones to improve head tracking during each rotation of the disk. In addition, the servo tracking zones need not be straight radial zones as shown in the figure, but may instead comprise arcs, intermittent zones, or irregularly-shaped zones separating individual data tracks.

In conventional hard disk drives, data is stored in terms of bits along the data tracks. In operation, the disk is rotated at a relatively high speed, and the magnetic head assembly is mounted on the end of a support or actuator arm, which radially positions the head on the disk surface. If the actuator arm is held stationary, the magnetic head assembly will pass over a circular path on the disk, i.e., over a data track, and information can be read from or written to that track. Each concentric track has a unique radius, and reading and writing information from or to a specific track requires the magnetic head to be located above that track. By moving the actuator arm, the magnetic head assembly is moved radially on the disk surface between tracks. Many actuator arms are rotatable, wherein the magnetic head assembly is moved between tracks by activating a servomotor which pivots the actuator arm about an axis of rotation. Alternatively, a linear actuator may be used to move a magnetic head assembly radially inwardly or outwardly along a straight line.

As has been stated above, to record information on the disk, the transducer creates and applies a highly concentrated magnetic field in close proximity to the magnetic recording medium. During writing, the strength of the concentrated magnetic field directly under the write transducer is greater than the coercivity of the recording medium, and grains of the recording medium at that location are magnetized in a direction which matches the direction of the applied magnetic field. The grains of the recording medium retain their magnetization after the magnetic field is removed. As the disk rotates, the direction of the writing magnetic field is alternated, based on bits of the information being stored, thereby recording a magnetic pattern on the track directly under the write transducer.

On each track, eight "bits" typically form one "byte" and bytes of data are grouped as sectors. Reading or writing a sector requires knowledge of the physical location of the data in the data zone so that the servo-controller of the disk drive can accurately position the read/write head in the correct location at the correct time. Most disk drives use disks with embedded "servo patterns" of magnetically readable information. The servo patterns are read by the magnetic head assembly to inform the disk drive of track location. In conventional disk drives, tracks typically include both data sectors and servo patterns and each servo pattern typically includes radial indexing information, as well as a "servo burst". A servo burst is a centering pattern to precisely position the head over the center of the track. Because of the locational precision needed, writing of servo patterns requires expensive servo-pattern writing equipment and is a time consuming process.

Commonly assigned U.S. Pat. No. 5,991,104 to Bonyhard, the entire disclosure of which is incorporated herein by reference, discloses a method for rapidly forming servo patterns in magnetic disk media, comprising steps of:

1) aligning a magnetic disk immediately adjacent a master servo-writer medium, the latter having a greater magnetic coercivity than the former, wherein the servo-writer medium has a master servo pattern magnetically stored thereon which defines a plurality of concentric tracks;

2) applying a magnetic assist field to the aligned master servo-writer medium and magnetic disk, the magnetic assist field having a substantially equal magnitude at all tracks on the aligned master servo-writer medium and magnetic disk; and 3) rotating the aligned master servo-writer medium and magnetic disk relative to the magnetic assist field.

However, the above-described method incurs several drawbacks associated with its implementation in an industrially viable manner. Specifically, a "one-of-a-kind" master writer with a very high write field gradient is necessary for writing the requisite high intensity, master magnetic servo pattern onto the master disk, and a complicated means for rotating the aligned master servo-writer disk and "slave" workpiece magnetic disk is required, as is a complex system for controlling/regulating/rotating the intensity (i.e., magnitude) and directions of the magnetic assist field.

Commonly assigned, co-pending U.S. patent application Ser. No. 10/082,178, filed Feb. 26, 2002, the entire disclosure of which is incorporated herein by reference, discloses an improvement over the invention disclosed in the aforementioned commonly assigned U.S. Pat. No. 5,991,104, and is based upon discovery that very sharply defined magnetic transition patterns can be reliably, rapidly, and cost-effectively formed in a magnetic medium containing a longitudinal or perpendicular type magnetic recording layer: (1) without requiring expensive, complicated fabrication of a master disk (alternatively referred to as a "stamper/imprinter") having a contacting (i.e., imprinting) surface comprised of a plurality of magnets or magnetizable areas corresponding to the desired magnetic transition pattern to be formed in the magnetic disk (i.e., "slave"), and (2) without requiring rotation of the master/slave pair in a magnetic assist field of variable strength and polarity.

Specifically, the invention disclosed in commonly assigned U.S. patent application Ser. No. 10/082,178 is based upon recognition that a stamper/imprinter ("master") comprised of a magnetic material having a high saturation magnetization, $B_{sat}$, i.e., $B_{sat} \geq$ about 0.5 Tesla, and a high permeability, $\mu$, i.e., $\mu \geq$ about 5, e.g., selected from Ni, NiFe, CoNiFe, CoSiFe, CoFe, and CoFeV, can be effectively utilized as a "master" contact mask (or "stamper/imprinter") for contact printing of a magnetic transition pattern, e.g., a servo pattern, in the surface of a magnetic recording layer of a magnetic medium ("slave"), whether of longitudinal or perpendicular type. A key feature of the invention is the use of a stamper/imprinter having an imprinting surface including a topographical pattern, i.e., comprised of projections and depressions, corresponding to a desired magnetic transition pattern, e.g., a servo pattern, to be formed in the magnetic recording layer. An advantage afforded by the invention is the ability to fabricate the topographically patterned imprinting surface of the stamper/imprinter, as well as the substrate or body therefor, of a single material, as by use of well-known and economical electro-forming techniques.

According to the disclosed invention, the magnetic domains of the magnetic recording layer of the slave medium are first unidirectionally aligned (i.e., "erased" or "initialized"), as by application of a first external, unidirectional magnetic field $H_{initial}$ of first direction and high strength greater than the coercivity the magnetic recording layer, typically 2,000–10,000 Oe. The imprinting surface of the stamper/imprinter (master) is then brought into intimate (i.e., touching) contact with the surface of the magnetic recording layer (slave). With the assistance of a second externally applied magnetic field of second, opposite direction and lower but appropriate strength $H_{re-align}$, determined by $B_{sat}/\mu$ of the stamper material (typically 1,000–5,000 Oe), the alignment of the magnetic domains at the areas of contact between the projections of the imprinting surface of the stamper/imprinter or at the areas facing the depressions of the imprinting surface of the stamper/imprinter and the magnetic recording layer of the medium to be patterned (slave) is selectively reversed, while the alignment of the magnetic domains at the non-contacting areas (defined by the depressions in the imprinting surface of the stamper/imprinter) or at the contacting areas, respectively, is unaffected, whereby a sharply defined magnetic transition pattern is created within the magnetic recording layer of the medium to be patterned (slave) which essentially mimics the topographical pattern of projections and depressions of the imprinting surface (master). According to the invention, high $B_{sat}$ and high $\mu$ materials are preferred for use as the stamper/imprinter in order to: (1) avoid early magnetic saturation of the stamper/imprinter at the contact points between the projections of the imprinting surface and the magnetic recording layer, and (2) provide an easy path for the magnetic flux lines which enter and/or exit at the side edges of the projections.

A stamper/imprinter for use in a typical application according to the disclosed invention, e.g., servo pattern formation in a disk-shaped, thin film, longitudinal or perpendicular magnetic recording medium, is formed according to conventional techniques, and comprises an imprinting surface having topographical features consisting of a pattern of well-defined projections and depressions corresponding to conventional servo patterns, as for example, disclosed in the aforementioned commonly assigned U.S. Pat. No. 5,991,104 to Bonyhard. For example, a suitable topography may comprise a plurality of projections having a height in the range from about 20 to about 500 nm, a width in the range from about 0.01 to about 1 $\mu$m, and a spacing of at least about 0.01 $\mu$m. Stampers/imprinters comprising imprinting surfaces with suitable surface topographies may be readily formed by a variety of techniques, such as electroforming onto a planar-surfaced substrate through an apertured, non-conductive mask, or by pattern formation in a planar-surfaced substrate by means photolithographic wet (i.e., chemical) or dry (e.g., plasma, sputter, or ion beam) etching techniques.

FIG. 3 illustrates a sequence of steps for performing magnetic transition patterning by contact printing of a longitudinal recording medium, e.g., medium 1 depicted in FIG. 1 and comprised of a non-magnetic substrate 10 and an overlying thin layer 13 of a longitudinal-type magnetic layer (plating layer 11, polycrystalline underlayer 12, protective overcoat layer 14, and lubricant topcoat layer 15 are omitted from FIG. 3 in order not to unnecessarily obscure the essential features/aspects of the present invention) is initially subjected to a magnetic erase (or "initialization") process for unidirectionally aligning the longitudinally oriented magnetic domains $13_=$ of magnetic recording layer 13. Magnetic initialization of longitudinal medium 1 is accomplished by applying a first, high strength, unidirectional magnetic field $H_{initial}$ parallel to the surface of the magnetic recording layer, such that $H_{initial}$>coercivity of layer 13' and is typically in the range from about 2,000 to about 10,000 Oe. In this instance, $H_{initial}$ is applied perpendicularly (i.e., normal) to the side edges of medium 1, whereas, by contrast, $H_{initial}$ for a perpendicular medium would be applied normal to the upper and lower major surfaces of the medium.

According to the next step of the process sequence, a stamper/imprinter 16 comprised of a body of magnetic material having a high saturation magnetization, $B_{sat}$, i.e., $B_{sat} \geq$ about 0.5 Tesla, and a high permeability, $\mu$, i.e., $\mu \geq$ about 5, e.g., selected from Ni, NiFe, CoNiFe, CoSiFe, CoFe, and CoFeV, with an imprinting surface 17 having a topography comprised of a plurality of projections 18 and depressions 19 arranged in a pattern corresponding to a magnetic transition pattern to be formed in the surface of magnetic recording layer 13, e.g., a servo pattern, is placed in intimate (i.e., touching) contact with the surface of layer 13. A suitable topography for the imprinting surface 17 of a contact mask-type stamper/imprinter 16 for use in forming a servo pattern in longitudinal recording layer 13 according to the invention may comprise a plurality of projections 18 having a height in the range from about 20 to about 500 nm, a width of at least about 0.01 $\mu$m, and a spacing (defining the depressions 19) in the range from about 0.01 to about 1 $\mu$m. A second, unidirectional magnetic re-alignment field $H_{re-align}$ parallel to the major surface of magnetic recording layer 13 but of lower strength and direction reverse that of the magnetic initialization field $H_{initial}$ is then applied normal to the side edge surfaces of stamper/imprinter 16, the strength of $H_{re-align}$ being optimized at a value determined by $B_{sat}/\mu$ of the stamper material and the coercivity of the magnetic layer (typically 1,000–5,000 Oe for the above-listed high $B_{sat}$, high $\mu$ materials). According to the invention, due to the high permeability $\mu$ of the stamper material, the magnetic flux $\phi$ provided by the re-alignment field $H_{re-align}$ enters and exits the side edges of the projections and tends to concentrate at the depressions 19 of the stamper/imprinter 16 (rather than at the projections 18). As a consequence, the non-contacted surface areas of magnetic recording layer 13 immediately beneath the depressions 19 experience a significantly higher magnetic field than the surface areas of the magnetic recording layer 13 in contact with the projections 18. If the re-alignment field strength $H_{re-align}$ is optimized, the direction of magnetization (i.e., alignment) of the longitudinally oriented magnetic domains $13_=$ of the magnetic recording layer 13 will be selectively reversed (as indicated by the arrows in the figure) at the areas facing the depressions 19 of the imprinting surface 17 of the stamper/imprinter 16, whereas the alignment of the longitudinally oriented magnetic domains $13_=$ of the magnetic recording layer 13 in contact with the projections 18 of the imprinting surface 17 of the stamper/imprinter 16 will be retained. Consequently, upon removal of the stamper/imprinter 16 and the re-alignment field $H_{re-align}$ in the next (i.e., final) step according to the inventive methodology, a longitudinal recording medium 1 is formed with a magnetic transition pattern comprising a plurality of reversely longitudinally oriented magnetic domains $13_{=R}$ corresponding to a desired servo pattern.

Conventional contact printing of longitudinal media typically involves application of pressure to the stamper/imprinter-media combination to maintain intimate contact therebetween, as by vacuum suction means, e.g., air channels such as vacuum holes or grooves formed within the stamper/imprinter body. However, while this method allows for the pressure to be uniformly applied to the combination of stamper/imprinter and media, the applied pressure is limited to atmospheric pressure, thereby limiting the ability to conform the imprinting surface of the stamper/imprinter to the media surface, the latter typically having a surface roughness of several $\mu$m over its surface.

In addition to the above drawback associated with maintaining intimate contact between the stamper/imprinter and media surface in contact printing of longitudinal recording media, the vacuum suction technique cannot be applied to certain types of stampers/imprinters, particularly electroformed Ni stampers/imprinters, the use of which is cost effective due to the ability to fabricate a large number of stampers/imprinters from a single master. The problem with utilizing Ni-based stampers/imprinters for contact printing of recording media arises when the magnetic field is applied from the back of the stamper/imprinter-media combination and the magnetizable Ni stamper/imprinter is attracted to the magnet, thereby reducing or breaking the vacuum suction between the stamper/imprinter and the media surface. As a consequence of the foregoing, contact printing of longitudinal media has generally been limited to the use of the vacuum suction technique and stampers/imprinters comprising a non-magnetic body (or backing), e.g., a Si wafer body or backing.

Accordingly, there exists a need for methodology for performing servo patterning of longitudinal magnetic recording media by contact printing which is free of the above-described drawback or disadvantage arising from poor or uneven contact between the surfaces of the stamper/imprinter and magnetic recording layer of the media to be patterned. Moreover, there exists a need for methodology for performing rapid, cost-effective servo patterning of thin film, high areal recording density longitudinal magnetic recording media which do not engender the above-stated concerns associated with the conventional and contact printing methodologies for patterning of magnetic media.

The present invention addresses and solves the above-described problems, disadvantages, and drawbacks associated with prior methodologies for servo pattern formation in thin film magnetic recording media, while maintaining full compatibility with the requirements of automated magnetic hard disk manufacturing technology.

DISCLOSURE OF THE INVENTION

An advantage of the present invention is an improved method of forming a magnetic transition pattern in a longitudinal magnetic recording medium.

Another advantage of the present invention is an improved apparatus for forming a magnetic transition pattern in a surface of a layer of a magnetic material by means of contact printing.

Additional advantages and other features and aspects of the present invention will be set forth in the description which follows and in part will become apparent to those having ordinary skill in the art upon examination of the following, or may be learned from the practice of the present invention. The advantages of the present invention may be realized as particularly pointed out in the appended claims.

According to an aspect of the present invention, the foregoing and other advantages are obtained in part by a method of forming a magnetic transition pattern in a longitudinal magnetic recording medium, comprising steps of:

(a) providing a magnetic recording medium including a layer of a magnetic material having a surface comprised of a plurality of longitudinally extending magnetic domains;

(b) contacting the surface of the layer of magnetic material with an imprinting surface of a stamper/imprinter, the imprinting surface of the stamper/imprinter comprising a plurality of projections and depressions arranged in a pattern corresponding to the magnetic transition pattern to be formed in the surface of the layer of magnetic material, the stamper/imprinter being formed of at least one high saturation magnetization, high permeability magnetic material; and (c) applying a unidirectional magnetic field perpendicular to the imprinting surface of the stamper/imprinter, the perpendicular magnetic field creating a longitudinal magnetic field component of sufficient strength to effect selective alignment of the magnetic domains of those portions of the layer of magnetic material which face the depressions of the imprinting surface of the stamper/imprinter, such that the magnetic domains of these portions are selectively aligned in a direction reverse that of the magnetic domains facing the projections of the imprinting surface of the stamper/imprinter, and the resulting combination of magnetic domains facing the depressions and projections of the imprinting surface of the stamper/imprinter forms a magnetic transition pattern replicating the pattern of projections and depressions of the imprinting surface of the stamper/imprinter.

In accordance with embodiments of the present invention, step (a) comprises providing a longitudinal magnetic recording medium comprising a non-magnetic substrate with the layer of magnetic material overlying a surface thereof; e.g., step (a) comprises providing a disk-shaped magnetic recording medium including a substrate comprised of a non-magnetic material selected from the group consisting of Al, NiP-plated Al, Al—Mg alloys, other Al-based alloys, other non-magnetic metals, other non-magnetic metal-based alloys, glass, ceramics, polymers, glass-ceramics, and composites and/or laminates thereof; and step (b) comprises contacting the surface of the layer of magnetic material with an imprinting surface of a stamper/imprinter formed of at least one magnetic material having high saturation magnetization and high permeability, selected from the group consisting of Ni, NiFe, CoNiFe, CoSiFe, CoFe, and CoFeV.

In accordance with certain embodiments of the present invention, step (a) optionally comprises providing a magnetic recording medium wherein the layer of magnetic material has been subjected to application of a unidirectional magnetic field having a first direction parallel to the surface of the layer of magnetic material and a high strength sufficient to align each of the longitudinally extending magnetic domains in the first direction and step (c) comprises creating a longitudinal magnetic field component having a second direction reverse that of the first direction and a lower strength than that of the unidirectional DC magnetic field; whereas, according to certain other embodiments of the invention, step (a) optionally comprises providing a magnetic recording medium wherein the layer of magnetic material has been subjected to an AC demagnetization or erase procedure.

According to preferred embodiments of the present invention, step (b) comprises contacting the surface of the layer of magnetic material with a stamper/imprinter having an imprinting surface including a plurality of projections and depressions arranged in a pattern corresponding to a servo pattern to be formed in the surface of the layer of magnetic material; and step (c) comprises applying the unidirectional magnetic field perpendicular to the imprinting surface of the stamper/imprinter at a field strength from about 6,000 to about 20,000 Oe, wherein step (c) further comprises creating a longitudinal magnetic field component having a field strength from about 3,000 to about 10,000 Oe.

Embodiments of the present invention comprise a further step of:

(d) removing the imprinting surface of the stamper/imprinter from contact with the surface of the layer of magnetic material.

Another aspect of the present invention is an apparatus for forming a magnetic transition pattern in a surface of a layer of a magnetic material by means of contact printing, comprising:

(a) a stamper/imprinter having an imprinting surface, the imprinting surface comprising a plurality of projections and depressions arranged in a pattern corresponding to the magnetic transition pattern to be formed in the surface of the layer of magnetic material, the stamper/imprinter being formed of at least one high saturation magnetization, high permeability magnetic material, (b) means for supporting a magnetic recording medium including a layer of a magnetic material having a surface comprised of a plurality of longitudinally extending magnetic domains;

(c) means for maintaining the imprinting surface of the stamper/imprinter in intimate contact with the surface of the layer of magnetic material; and (d) magnet means for applying a unidirectional magnetic field perpendicular to the imprinting surface of the stamper/imprinter, the perpendicular magnetic field creating a longitudinal magnetic field component of sufficient strength to effect selective alignment of the magnetic domains of those portions of the layer of magnetic material which face the depressions of the imprinting surface of the stamper/imprinter, such that the magnetic domains of these portions are selectively aligned in a direction reverse that of the magnetic domains facing the projections of the imprinting surface of the stamper/imprinter, and the resulting combination of magnetic domains facing the depressions and projections of the stamper/imprinter forms a magnetic transition pattern replicating the pattern of projections and depressions of the imprinting surface of the stamper/imprinter.

According to embodiments of the present invention, the imprinting surface of the stamper/imprinter is formed of at least one magnetic material having high saturation magnetization and high permeability, selected from the group consisting of Ni, NiFe, CoNiFe, CoSiFe, CoFe, and CoFeV; and the stamper/imprinter comprises an imprinting surface including a plurality of projections and depressions arranged in a pattern corresponding to a servo pattern to be formed in the surface of the layer of magnetic material.

In accordance with preferred embodiments of the present invention, magnet means (d) comprises means for applying a unidirectional re-alignment magnetic field perpendicular to the imprinting surface of the stamper/imprinter having a field strength from about 6,000 to about 20,000 Oe, and magnet means (d) further comprises means for creating a longitudinal magnetic field component having a field strength from about 3,000 to about 10,000 Oe.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein.

DESCRIPTION OF THE INVENTION

The present invention, termed "perpendicularly-applied-longitudinal magnetic ('PALM') printing", addresses and solves the above-described problems and difficulties attendant upon magnetic patterning of longitudinal magnetic recording media by means of contact printing utilizing a longitudinally applied magnetic re-alignment field, and is based upon the discovery that application of a perpendicular magnetic field to perpendicularly magnetize a magnetic stamper/imprinter utilized for performing selective re-alignment of the magnetic domains of longitudinal recording media can create a longitudinal field component of substantial strength, sufficient for contact printing magnetic transition patterns in longitudinal recording media. In contrast with conventional practices for contact printing of longitudinal recording media involving use of a longitudinally applied magnetic re-alignment field, the present invention advantageously facilitates use of magnetic-backed stampers/imprinters, such as Ni-based stampers/imprinters, without incurring the above-described problem/drawback of poor contact (which may result from magnetic attraction) between the stamper/imprinter and the electromagnet tending to break the vacuum (suction) between the imprinting surface of the stamper/imprinter and the medium being patterned. In addition, the inventive methodology creates greater field contrast than the conventional art (i.e., longitudinal applied magnetic re-alignment field for longitudinal media), thereby providing high coercivity media with higher quality magnetic transition patterns.

Calculations of the perpendicular and longitudinal field components from fully-magnetized pattern bars of a Ni-based stamper/imprinter were determined for perpendicular and longitudinal fields applied to longitudinal and perpendicular recording media. The calculation is a two-dimensional (2D) calculation assuming infinitely long pattern bars. The height "h", of the stamper/imprinter bars was taken as 200 nm, and three values of the down-track length "L" of the stamper/imprinter bars (i.e., 200, 500 and 1,000 nm) were used at a duty cycle of 50%, i.e., p=2L, where "p" is the period, and p=400, 1,000, and 2,000 nm, respectively. A saturation magnetization $B_s$ of 6,500 Oe was used for the Ni-based stamper/imprinter. The fields were calculated at d=3 nm, where "d" is the distance from the imprinting surface of the stamper/imprinter.

Figure 4:
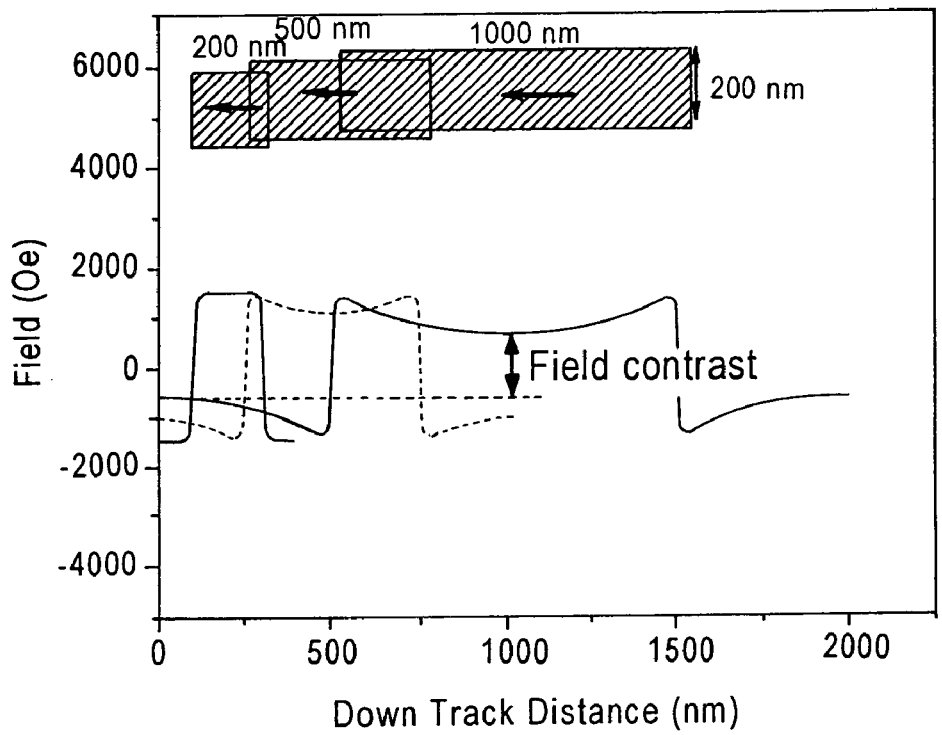
FIG. 4 is a graph for illustrating the variation of the longitudinal field component from a stamper/imprinter as a function of down-track distance of a longitudinal magnetic recording medium, in the case of a longitudinal applied magnetic field.
Figure 5:
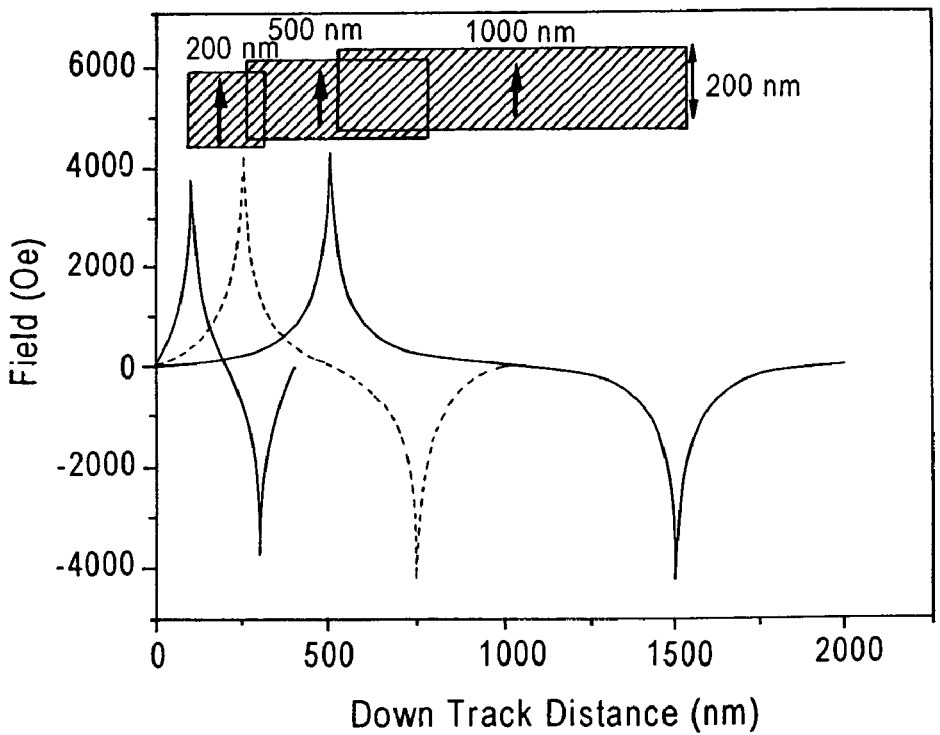
FIG. 5 is a graph for illustrating the variation of the longitudinal field component from a stamper/imprinter as a function of down-track distance of a longitudinal magnetic recording medium, in the case of a perpendicular applied magnetic field.

Adverting to FIGS. 4 and 5, the former is a graph for illustrating the variation of the longitudinal field component from a stamper/imprinter as a function of down-track distance of a longitudinal magnetic recording medium, in the case of a longitudinal applied magnetic field; and the latter is a graph for illustrating the variation of the longitudinal field component from a stamper/imprinter as a function of down-track distance of a longitudinal magnetic recording medium, in the case of a perpendicular applied magnetic field.

The field contrast of the longitudinally-magnetized stamper/imprinter decreases as down-track length L of the pattern bar increases in the case of longitudinal recording media, i.e., from about 3,000 Oe at L=200 nm to about 1,200 Oe at L=1,000 nm.

As for the case where a perpendicularly-magnetized stamper/imprinter is utilized with a longitudinal recording medium (FIG. 5), the field contrast increases as down-track length L of the pattern bar increases and is >7,000 Oe for L=200, 500, and 1,000 nm, which field contrast is much higher than when the stamper/imprinter is longitudinally magnetized (FIG. 4).

According to the invention, when utilized with stampers/imprinters formed of at least one magnetic material having high saturation magnetization $B_{sat} \geq$ about 0.5 Tesla, and a high permeability $\mu \geq$ about 5, e.g., selected from among Ni, NiFe, CoNiFe, CoSiFe, CoFe, and CoFeV, the magnet means, e.g., electromagnet, for applying the unidirectional re-alignment magnetic field perpendicular to the imprinting surface of the stamper/imprinter should be capable of applying a field strength from about 6,000 to about 20,000 Oe, preferably about 16,000 Oe, such that a longitudinal magnetic field component having a field strength from about 3,000 to about 10,000 Oe, preferably about 5,000 Oe, is created.

Another advantageous feature of the present invention is that the PALM process does not require magnetic initialization of the media, i.e., uniform alignment of the direction of magnetization of the magnetic domains of the recording layer, as by application of a high strength, unidirectional DC magnetic field. According to the invention, the media may, if desired, be subjected to application of either a high strength, unidirectional DC magnetic field for initialization (i.e., unidirectional orientation of the magnetic domains) or an AC erase procedure. However, the latter option is advantageous in that the former option requires application of a higher strength perpendicular alignment field, typically from about 15,000 to about 20,000 Oe. It should also be noted in this regard that the inventive process may be performed without subjecting the media to an initialization or erase treatment, provided the perpendicular alignment field is of sufficient strength, typically from about 15,000 to about 20,000 Oe.

Figure 1:
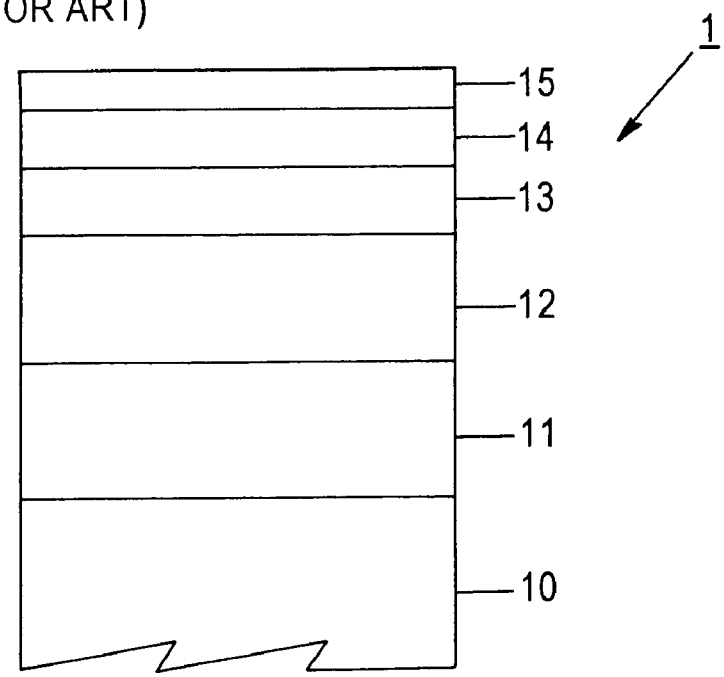
FIG. 1 illustrates, in schematic, simplified cross-sectional view, a portion of a longitudinal-type thin-film magnetic recording medium.
Figure 2:
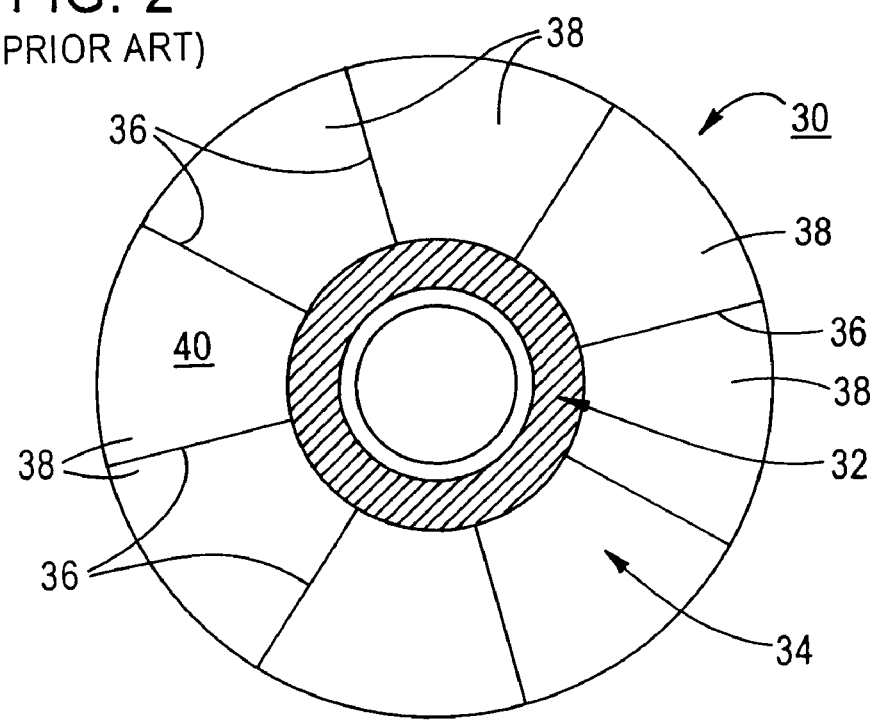
FIG. 2 is a simplified, schematic plan view, of a magnetic recording disk for illustrating the data, servo pattern, and CSS zones thereof.
Figure 3:
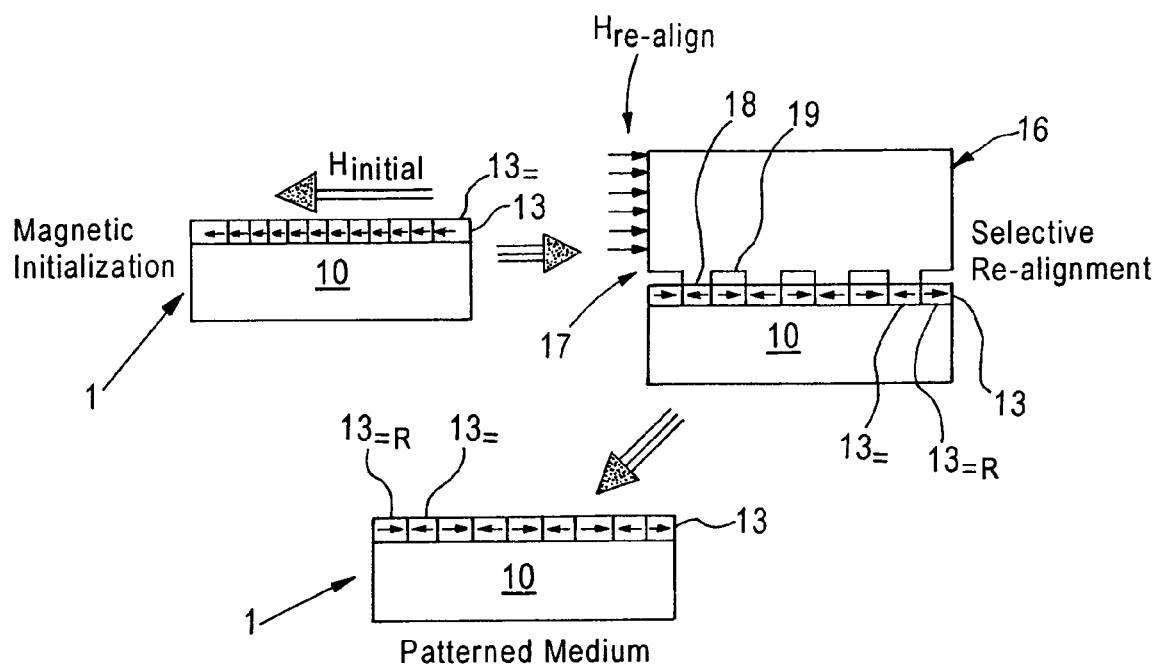
FIG. 3 illustrates, in schematic, simplified cross-sectional view, a sequence of process steps performed according to conventional practice for creating a magnetic transition pattern in a the surface of a magnetic layer of a longitudinal-type thin-film magnetic recording medium by means of contact printing.
Figure 6:
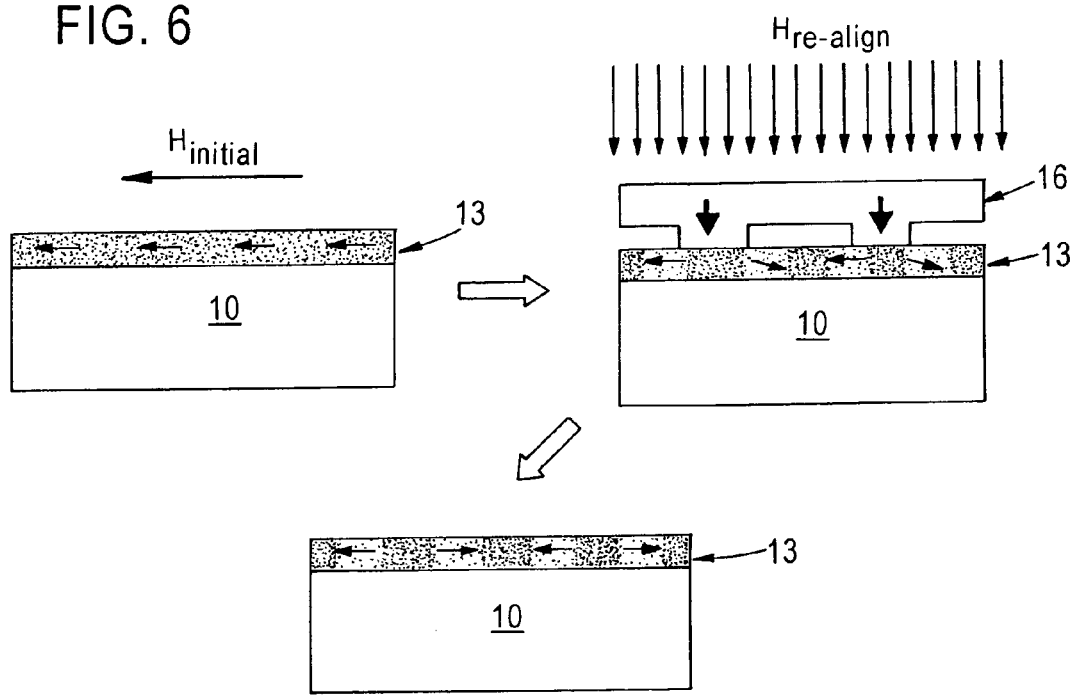
FIG. 6 illustrates, in schematic, simplified cross-sectional view, a sequence of process steps performed according to the present invention for creating a magnetic transition pattern in the surface of a magnetic layer of a longitudinal-type thin-film magnetic recording medium by means of contact printing with a perpendicular applied magnetic re-alignment field.

Referring to FIG. 6, shown therein, in schematic, simplified cross-sectional view, is a sequence of process steps performed according to the present invention for creating a magnetic transition pattern in a the surface of a magnetic layer of a longitudinal-type thin-film magnetic recording medium by means of contact printing with a perpendicular applied magnetic re-alignment field. As should be evident, the process sequence of the inventive embodiment of FIG. 6 differs from that of the conventional art, as shown in FIG. 3, in that application of the high strength unidirectional DC magnetic field for performing magnetic initialization is optional and a perpendicular rather than longitudinal (i.e., parallel) magnetic field is applied to the stamper/imprinter in the selective alignment step.

Figure 7:
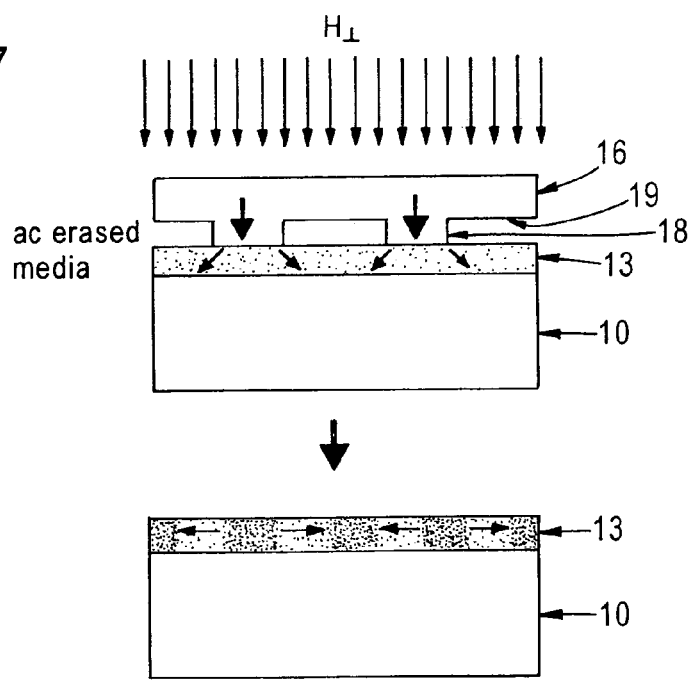
FIG. 7 illustrates, in schematic, simplified cross-sectional view, a generally similar sequence of process steps performed according to the invention, wherein the media is subjected to an AC erase procedure prior to contact printing of a magnetic transition pattern therein by application of a unidirection DC alignment field perpendicular to the imprinting surface of the stamper/imprinter.

FIG. 7 illustrates, in schematic, simplified cross-sectional view, a generally similar sequence of process steps according to the invention wherein the media is subjected to an AC erase procedure prior to contact printing of a magnetic transition pattern therein by application of a unidirectional DC alignment field perpendicular to the imprinting surface of the stamper/imprinter.

The present invention thus affords a number of advantages and improvements in methodology for contact printing of magnetic transition patterns in magnetic recording media utilizing magnetizable stampers/imprinters. Specifically, the present invention advantageously facilitates use of magnetic-backed stampers/imprinters, such as Ni-based stampers/imprinters, without incurring the problem/drawback of poor contact between the stamper/imprinter and the electromagnet tending to break the vacuum (suction) between the imprinting surface of the stamper/imprinter and the medium being patterned. In addition, the inventive methodology creates greater field contrast than the conventional art (i.e., longitudinal applied magnetic re-alignment field for longitudinal media), thereby providing high coercivity media with higher quality magnetic transition patterns.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. A method of forming a magnetic transition pattern in a longitudinal magnetic recording medium, comprising steps of:
   (a) providing a magnetic recording medium including a layer of a magnetic material having a surface comprised of a plurality of longitudinally extending magnetic domains;
   (b) contacting said surface of said layer of magnetic material with an imprinting surface of a stamper/imprinter, said imprinting surface of said stamper/imprinter comprising a plurality of projections and depressions arranged in a pattern corresponding to said magnetic transition pattern to be formed in said surface of said layer of magnetic material, said stamper/imprinter being formed of at least one high saturation magnetization, high permeability magnetic material; and
   (c) applying a unidirectional magnetic field perpendicular to said imprinting surface of said stamper/imprinter, said perpendicular magnetic field creating a longitudinal magnetic field component of sufficient strength to effect selective alignment of the magnetic domains of those portions of said layer of magnetic material which face said depressions of said imprinting surface of said stamper/imprinter, such that the magnetic domains of these portions are selectively aligned in a direction reverse that of the magnetic domains facing said projections of said imprinting surface of said stamper/imprinter, and the resulting combination of magnetic domains facing said depressions and projections of said imprinting surface of said stamper/imprinter forms a magnetic transition pattern replicating said pattern of projections and depressions of said imprinting surface of said stamper/imprinter.

2. The method according to claim 1, wherein:
step (a) comprises providing a longitudinal magnetic recording medium comprising a non-magnetic substrate with said layer of magnetic material overlying a surface thereof.

3. The method according to claim 2, wherein:
step (a) comprises providing a disk-shaped magnetic recording medium including a substrate comprised of a non-magnetic material selected from the group consisting of non-magnetic metal, non-magnetic metal-based alloys, Al, NiP-plated Al, Al-based alloys, Al—Mg alloys, glass, ceramics, polymers, glass-ceramics, and composites and/or laminates thereof.

4. The method according to claim 1, wherein:
step (a) comprises providing a magnetic recording medium wherein the layer of magnetic material has been subjected to application of a unidirectional DC magnetic field having a first direction parallel to the surface of the layer of magnetic material and a high strength sufficient to align each of the longitudinally extending magnetic domains in the first direction.

5. The method according to claim 4, wherein:
step (c) comprises creating a longitudinal magnetic field component having a second direction reverse that of said first direction and a lower strength than that of said unidirectional DC magnetic field.

6. The method according to claim 4, wherein:
step (a) comprises providing a magnetic recording medium wherein the layer of magnetic material has been subjected to an AC demagnetization or erase procedure.

7. The method according to claim 1, wherein:

step (b) comprises contacting said surface of said layer of magnetic material with a said imprinting surface of a said stamper/imprinter formed of at least one magnetic material having high saturation magnetization and high permeability, selected from the group consisting of Ni, NiFe, CoNiFe, CoSiFe, CoFe, and CoFeV.

8. The method according to claim 7, wherein:

step (c) comprises applying said unidirectional perpendicular magnetic field to said imprinting surface of said stamper/imprinter at a field strength from about 6,000 to about 20,000 Oe.

9. The method according to claim 8, wherein:

step (c) further comprises creating a longitudinal magnetic field component having a field strength from about 3,000 to about 10,000 Oe.

10. The method according to claim 1, wherein:

step (c) comprises contacting said surface of said layer of magnetic material with a stamper/imprinter having an imprinting surface including a plurality of projections and depressions arranged in a pattern corresponding to a servo pattern to be formed in said surface of said layer of magnetic material.

11. The method according to claim 1, further comprising the step of:

(e) removing said imprinting surface of said stamper/imprinter from contact with said surface of said layer of magnetic material.

* * * * *